United States Patent [19]
Yoon

[11] Patent Number: 6,097,175
[45] Date of Patent: Aug. 1, 2000

[54] METHOD FOR CHARGING AND DISCHARGING A SMART BATTERY OF AN ELECTRONIC EQUIPMENT

[75] Inventor: Ji-Seob Yoon, Suwon, Rep. of Korea

[73] Assignee: SamSung Electronics Co., Ltd., Kyungki-do, Rep. of Korea

[21] Appl. No.: 09/139,755

[22] Filed: Aug. 25, 1998

[30] Foreign Application Priority Data

Aug. 25, 1997 [KR] Rep. of Korea .................. 97-40598

[51] Int. Cl.⁷ ................................................. H02J 7/00
[52] U.S. Cl. .......................................... 320/132; 320/130
[58] Field of Search ................................. 320/130, 132, 320/136, 134, 135

[56] References Cited

U.S. PATENT DOCUMENTS

| | | | |
|---|---|---|---|
| 5,349,282 | 9/1994 | McClure | 320/136 |
| 5,430,363 | 7/1995 | Kim | 320/128 |
| 5,432,429 | 7/1995 | Armstrong, II et al. | 320/136 |
| 5,582,928 | 12/1996 | Farley | 320/150 |
| 5,600,230 | 2/1997 | Dunstan | 320/DIG. 21 |
| 5,600,566 | 2/1997 | Park | 320/DIG. 21 |
| 5,604,416 | 2/1997 | Kim | 320/135 |
| 5,606,242 | 2/1997 | Hull et al. | 320/106 |
| 5,629,604 | 5/1997 | Sengupta et al. | 320/145 |
| 5,652,502 | 7/1997 | van Phuoc et al. | 320/134 |
| 5,686,815 | 11/1997 | Reipur et al. | 320/116 |
| 5,691,621 | 11/1997 | Phuoc et al. | 320/134 |
| 5,691,624 | 11/1997 | Im et al. | 320/148 |
| 5,710,501 | 1/1998 | van Phuoc et al. | 320/152 |
| 5,747,189 | 5/1998 | Perkins | 429/91 |
| 5,770,938 | 6/1998 | Kao | 320/148 |
| 5,883,497 | 3/1999 | Turnbull | 320/132 |

*Primary Examiner*—Peter S. Wong
*Assistant Examiner*—Lawrence Luk
*Attorney, Agent, or Firm*—Robert E. Bushnell, Esq.

[57] ABSTRACT

A system and process of properly controlling the charging and discharging a smart battery of an electronic equipment even if data information of the smart battery is not exact. The process is comprised of receiving data information from the smart battery and then detecting a charged level of the smart battery; checking, through analog/digital converting terminals a power terminal of the smart battery and directly detecting a battery voltage of the smart battery; determining whether the charged level is at a low-charged level; determining whether the battery voltage is lower than a first predetermined voltage; outputting the low battery state to the system if the charged level is at the low-charged level and the battery voltage is lower than the first predetermined voltage; determining whether the charged level is at a shut-down level; and determining whether the battery voltage is lower than a second predetermined voltage, and turning off the system, if the battery voltage is lower than the second predetermined voltage.

16 Claims, 7 Drawing Sheets

METHOD FOR CHARGING AND DISCHARGING A SMART BATTERY OF AN ELECTRONIC EQUIPMENT

CLAIM FOR PRIORITY

This application makes reference to, incorporates the same herein, and claims all benefits accruing under 35 U.S.C. §119 from an application for A METHOD FOR CHARGING AND DISCHARGING AN ELECTRONIC EQUIPMENT HAVING A SMART BATTERY THEREIN earlier filed in the Korean Industrial Property Office on the Aug. 25, 1997, and there duly assigned Ser. No. 40598/1997, a copy of which application is annexed hereto.

BACKGROUND OF THE INVENTION

1. Technical Field

The present invention relates to a method for charging and discharging a smart battery of an electronic equipment and, more particularly to a method for controlling the charging and discharging of a smart battery of an electronic equipment even if information data from the smart battery is not correct.

2. Related Art

Generally, batteries are used to supply power to portable electronic equipments such as personal computers, radios, radiophones, stereo cassette tape players etc. Such batteries are typically available in two different types such as those characterized as rechargeable or non-rechargeable and exhibit different end of life voltage characteristics and effective resistance. Nonrechargeable battery types are those ordinary alkaline batteries that should not be subjected to recharging attempts. Rechargeable battery types are those nickel-cadmium (Ni—Cd), nickel-hydrogen (Ni—H) and nickel metal-hydride (Ni—MH) batteries that should be charged at different rates with different conditions by different types of charging techniques such as disclosed in U.S. Pat. No. 5,430,363 for Charging Device And Method Performing Battery Activation Function issued to Kim, U.S. Pat. No. 5,686,815 for Method And Apparatus For Controlling The Charging Of A Rechargeable Battery To Ensure That Full Charge Is Achieved Without Damaging The Battery issued to Reipur et al., U.S. Pat. No. 5,691,624 for Method And Apparatus For Detecting A Full-Charge Condition While Charging A Battery issued to Im et al., and U.S. Pat. No. 5,770,938 for Real-Time Charging Control Of A Fast Battery Charger issued to Kao.

Traditional rechargeable batteries pose a number of problems, however. First, the user has little advance knowledge that the battery is about to run out or how much operating time is left. Second, the electronic equipment powered by the battery cannot determine if the battery, in its present state, is able to supply adequate power for an additional load. Third, the battery chargers must be individually tailored for use with a specific battery chemistry and cell design and may cause damage if used on another battery with a different battery chemistry or cell design. In order to address these problems and to maximize the useful life of a rechargeable battery, a dedicated microprocessor has been incorporated into a battery for intelligent battery management. These are known as "smart" batteries, and are currently available with different configurations as disclosed, for example, in U.S. Pat. No. 5,432,429 for System For Charging/Monitoring Batteries For A Microprocessor Based System issued to Armstrong, II et al., U.S. Pat. No. 5,600,230 for Smart Battery Providing Programmable Remaining Capacity And Run-Time Alarms Based On Battery-Specific Characteristics issued to Dunstan, U.S. Pat. No. 5,606,242 for Smart Battery Algorithm For Reporting Battery Parameters To An External Device issued to Hull et al., U.S. Pat. No. 5,652,502, U.S. Pat. No. 5,691,621 and U.S. Pat. No. 5,710,501 for Battery Pack Having A Processor Controlled Battery Operating System issued to van Phuoc et al., and U.S. Pat. No. 5,747,189 for Smart Battery issued to Perkins. The operation of a smart battery is well known, and therefore need not described herein. However, I have observed that any time, the charge information from the smart battery is incorrect or false, the smart battery can be overcharged or not charged at all. Another problem of a smart battery is that, when discharged, the information of the battery such as the remaining capacity can be incorrectly provided.

SUMMARY OF THE INVENTION

Accordingly, it is therefore an object of the present invention to provide a system and method for charging and discharging a smart battery of an electronic equipment.

It is also an object to provide a system and process of charging and discharging a smart battery having an embedded microprocessor for intelligent battery management in an electronic equipment.

It is further an object to provide a system and process of properly charging or discharging a smart battery of an electronic equipment even if the information from the smart battery is false.

It is yet another object to provide a system and process of controlling the charging and discharging of a smart battery having a microprocessor incorporated therein for intelligent battery management, even if the information from the microprocessor is false.

These and other objects of the present invention can be achieved by a system and process of charging a smart battery having an embedded microprocessor for intelligent battery management in an electronic equipment comprised of receiving data information from the microprocessor of the smart battery and detecting a charged level of the smart battery from the data information; checking a power terminal and a temperature terminal of the smart battery and directly detecting a battery voltage of the smart battery; determining whether the charged level of the smart battery is at a fully-charged level, and whether the battery voltage is higher than a predetermined voltage; and completing the charging, when the charged level of the smart battery is at the fully-charged level and the battery voltage is higher than the predetermined voltage.

Alternatively, a process of charging a smart battery having an embedded microprocessor implemented for intelligent battery management according to a second embodiment of the present invention is comprised of receiving data information from the smart battery and detecting a charged level of the smart battery from the data information; determining whether the charged level of the smart battery is at a fully-charged level; when the charged level of the smart battery is at the fully-charged level, checking a power terminal of the smart battery and directly detecting a battery voltage of the smart battery; determining whether the battery voltage of the smart battery is greater than a predetermined voltage; and completing the charging, when the battery voltage of the smart battery is greater than the predetermined voltage.

In accordance to another aspect of the present invention, a process of discharging a smart battery having an embedded battery for intelligent battery management in an electronic system is comprised of receiving data information from the smart battery and then detecting a charged level of the smart battery; checking a power terminal of the smart battery and directly detecting a battery voltage of the smart battery; determining whether the charged level of the smart battery is at a low-charged level; determining whether the battery voltage is lower than a first predetermined voltage; outputting a low battery state to the system if the charged level of the smart battery is at the low-charged level and the battery voltage is lower than the first predetermined voltage; determining whether the charged level is at a shot-down level; and determining whether the battery voltage is lower than a second predetermined voltage, and turning off the system, if the battery voltage is lower than the second predetermined voltage.

Alternatively, a process of discharging a smart battery having an embedded microprocessor implemented for intelligent battery management according to another embodiment of the present invention is comprised of: receiving data information from the smart battery and detecting a charged level of the smart battery from the data information; checking a power terminal and a temperature terminal of the smart battery and directly detecting a battery voltage of the smart battery; determining whether the charged level of the smart battery is at a low-charged level; when the charged level of the smart battery is at the low-charged level, determining whether the data information received from the microprocessor of the smart battery is checked twice; after the data information received from the microprocessor of the smart battery is checked twice, determining whether the battery voltage of the smart battery is less than a first predetermined voltage; when the battery voltage of the smart battery is less than the first predetermined voltage, outputting a low battery indication of the low-charged level to the electronic system; after the low battery indication of the low-charged level is output to the electronic system, determining whether the charged level of the smart battery is at a shut-down level; when the charged level of the smart battery is at the shut-down level, again determining whether the data information received from the microprocessor of the smart battery is checked twice; after the data information received from the microprocessor of the smart battery is again checked twice, determining whether the battery voltage of the smart battery is less than a second predetermined voltage; and when the battery voltage of the smart battery is less than the second predetermined voltage, shutting down the electronic system.

Alternatively, a process of discharging a smart battery having an embedded microprocessor implemented for intelligent battery management according to yet another embodiment of the present invention is comprised of: receiving data information from the smart battery and detecting a charged level of the smart battery from the data information; determining whether the charged level of the smart battery is at a low-charged level; when the charged level of the smart battery is at the low-charged level, determining whether the data information received from the microprocessor of the smart battery is checked twice; after the data information received from the microprocessor of the smart battery is checked twice, checking a power terminal of the smart battery and directly detecting a battery voltage of the smart battery; determining whether the battery voltage of the smart battery is less than a first predetermined voltage; when the battery voltage of the smart battery is less than the first predetermined voltage, outputting a low battery indication of the low-charged level to the electronic system; after the low battery indication of the low-charged level is output to the electronic system, determining whether the charged level of the smart battery is at a shut-down level; when the charged level of the smart battery is at the shut-down level, again determining whether the data information received from the microprocessor of the smart battery is checked twice; after the data information received from the microprocessor of the smart battery is again checked twice, checking again the power terminal of the smart battery and directly detecting the battery voltage of the smart battery; determining whether the battery voltage of the smart battery is less than a second predetermined voltage; and when the battery voltage of the smart battery is less than the second predetermined voltage, shutting down the electronic system.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
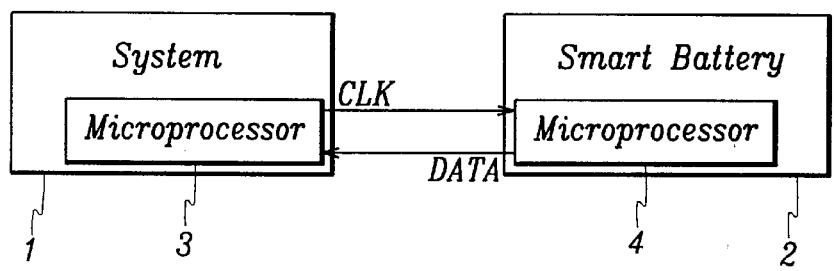
FIG. 1 is a block diagram of an exemplary system for controlling the charging and discharging of a smart battery.

Referring now to the drawings and particularly to FIG. 1, which illustrates an exemplary system for controlling the charging and discharging of a smart battery used in an electronic equipment. As shown in FIG. 1, the smart battery 2 has a battery-controlling microprocessor 4 incorporated therein for intelligent battery management. The battery-controlling microprocessor 4 provides information about the battery state, charging or remaining capacity and input voltage of the smart battery.

The system 1 has a system-controlling microprocessor 3 incorporated therein for controlling the charging and discharging of the smart battery 2. The system-controlling microprocessor 3 provides a clock and receives information about the battery state, charging or remaining capacity and input voltage of the smart battery from the battery-controlling microprocessor 4. That is, the system 1 controls the charging and discharging of a smart battery by receiving data from the battery-controlling microprocessor 4. A system management bus (SMBUS) technique is mostly used to exchange the above-identified data.

In a typical system having a smart battery incorporated therein, when the control of charging and discharging the smart battery is needed, there are problems. For example, if data information about the smart battery is false, the smart battery can be overcharged or not charged. Likewise, when discharged, data information such as the remaining capacity can be incorrectly provided.

Figure 2:
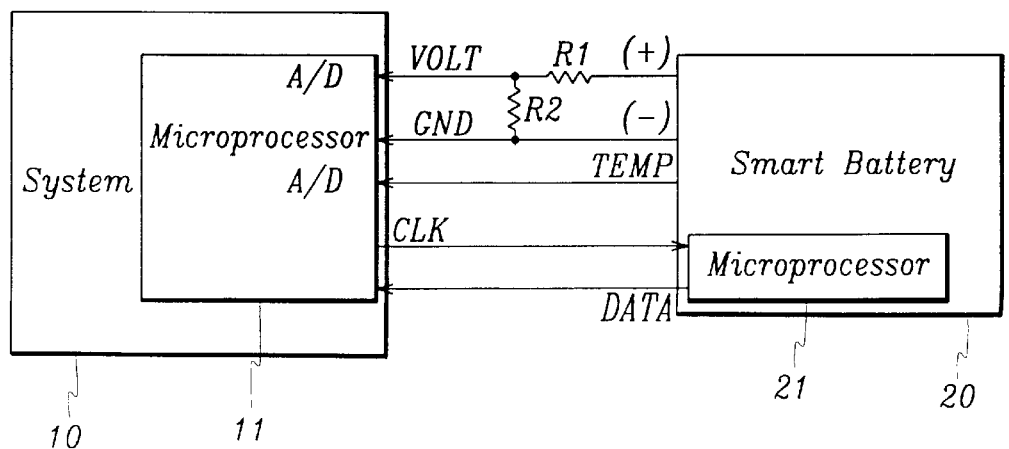
FIG. 2 is a block diagram of a system for controlling the charging and discharging of a smart battery of an electronic equipment according to the principles of the present invention.
Figure 3:
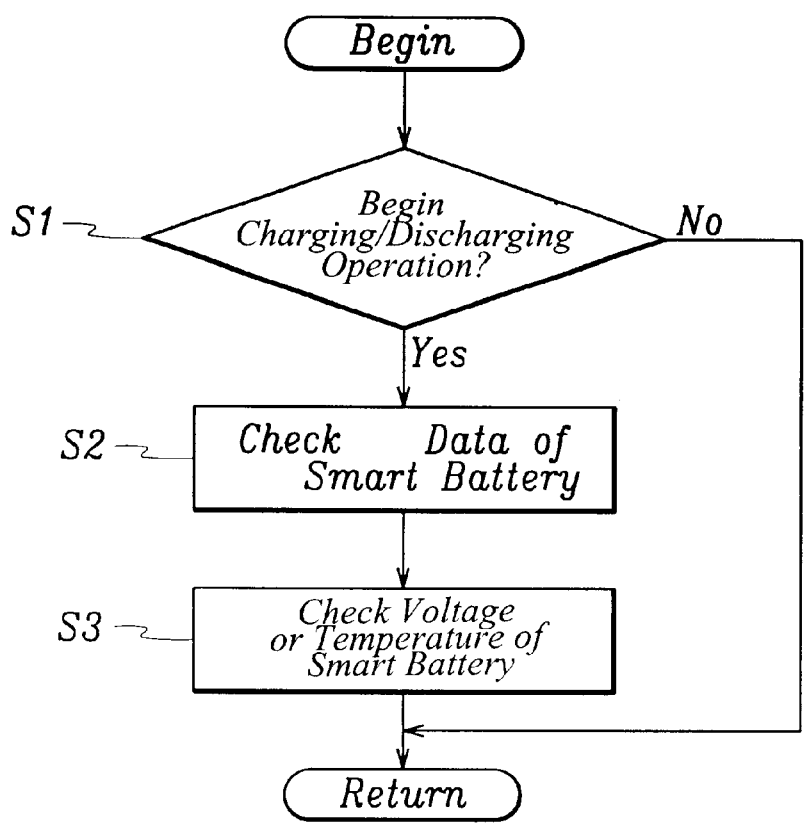
FIG. 3 is a flow chart of a process of charging and discharging a smart battery of an electronic equipment according to the present invention.

Turning now to FIG. 2, which illustrates a system for controlling the charging and discharging of a smart battery of an electronic equipment as constructed according to the principles of the present invention. The system of the present invention is further implemented with several intelligent battery management techniques of charging and discharging a smart battery efficiently and effectively, even if data information from the smart battery is false. Typically, a process of charging and discharging a smart battery of an electronic equipment generally requires checking data information from the smart battery and the voltage and temperature of the smart battery as illustrated in FIG. 3.

Figure 4:
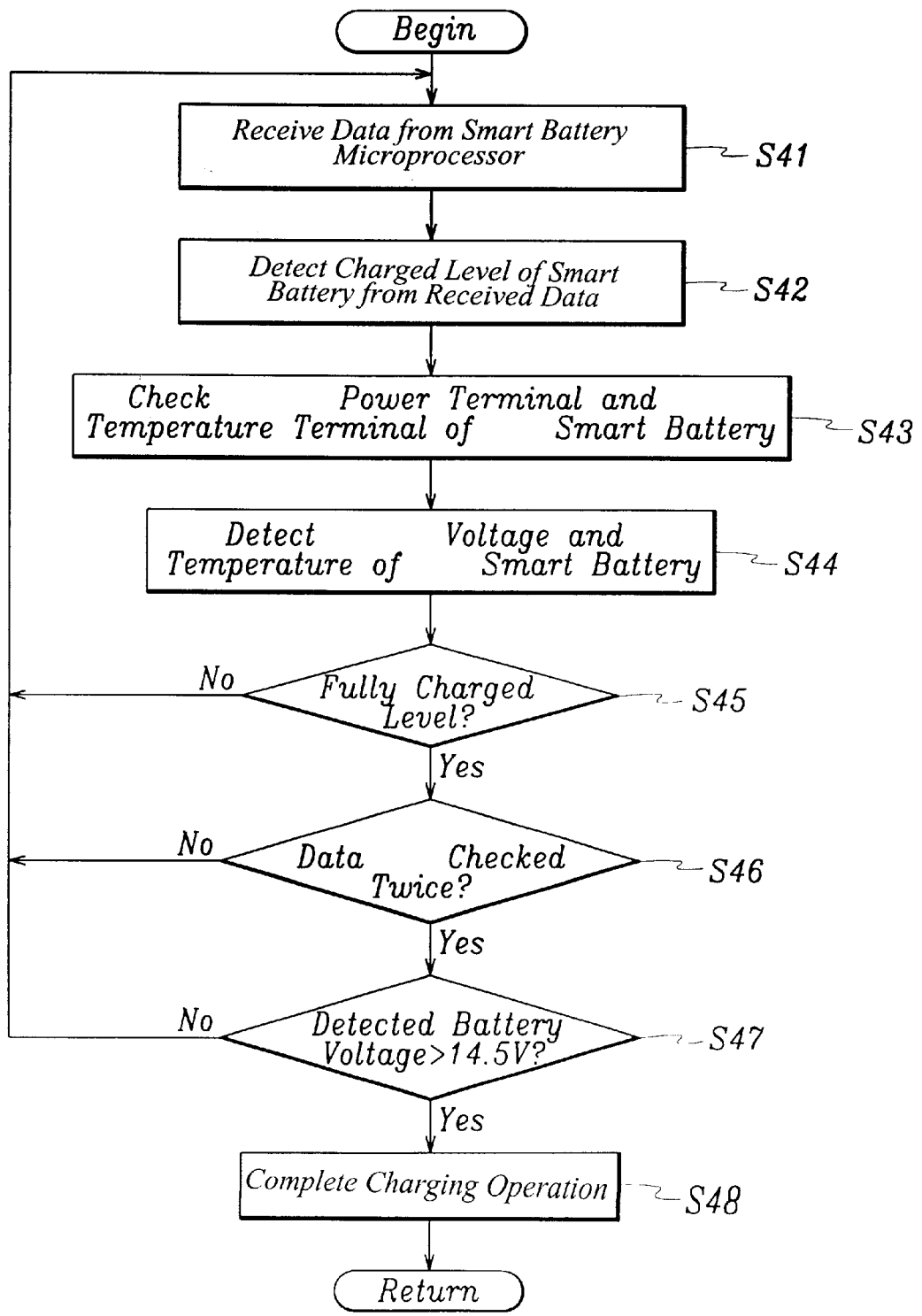
FIG. 4 is a flow chart of a process of charging a smart battery of an electronic equipment according to a first preferred embodiment of the present invention.

For charging purposes, the system is required to receive data information from the smart battery microprocessor so as to detect a charged level of the smart battery. In a first embodiment as shown in FIG. 4, the power terminal and the temperature terminal of a smart battery are checked for detection of the voltage and temperature of the smart battery. Charged level of the smart battery is then determined, and the data information from the smart battery is checked twice to ensure for accuracy. Next, the detected battery voltage is compared with a predetermined voltage (e.g., 14.5 Volts) for completion. In particular, the process of charging a smart battery of an electronic equipment according to the first embodiment of the present invention comprises the steps of receiving data information about the battery state, charging capacity and input voltage of the smart battery from a battery-controlling microprocessor (S41); detecting a charged level of the smart battery from the received data information (S42); checking a power terminal and a temperature terminal of the smart battery (S43); detecting the voltage and temperature of the smart battery (S44); determining whether the detected charged level is at a fully-charged level (S45); determining whether the data information is checked twice (S46); determining whether the detected battery voltage is higher than 14.5 Volts (S47); and completing the charging operation if the directly-detected battery voltage is higher than the 14.5 Volts (S48).

Figure 5:
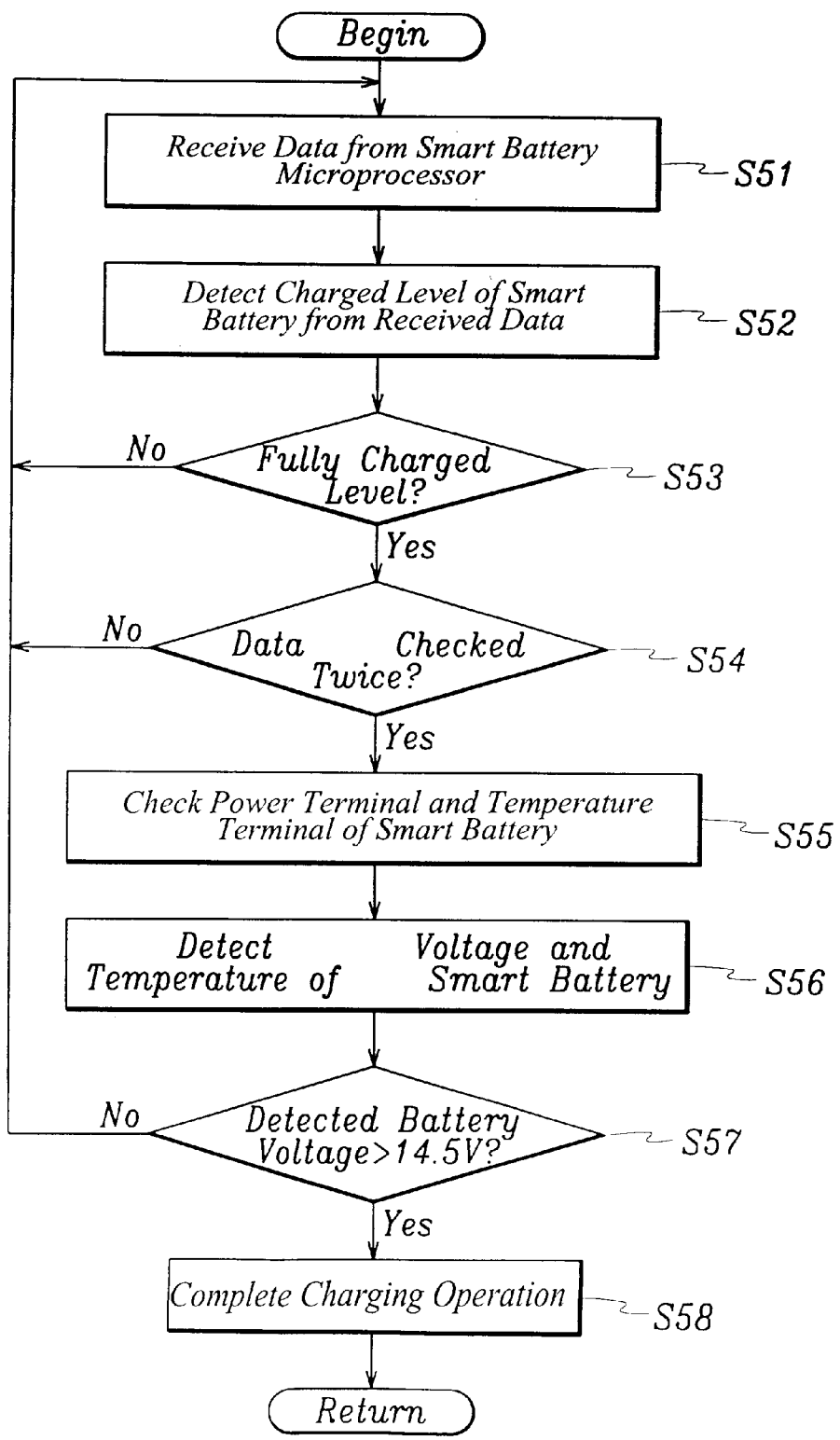
FIG. 5 is a flow chart of a process of charging a smart battery of an electronic equipment according to a second preferred embodiment of the present invention.

In a second embodiment as illustrated in FIG. 5, the charged level of the smart battery is determined immediately after detection of the charged level of the smart battery. Data information from the smart battery is also checked twice to ensure for accuracy. Then, the power terminal and temperature terminal of the smart battery are checked for detection of the voltage and temperature of the smart battery. Lastly, the detected battery voltage is compared with a predetermined voltage (e.g., 14.5 Volts) for completion. In particular, the process for charging a smart battery of an electronic equipment according to the second embodiment of the present invention comprises the steps of receiving data information about the battery state, charging capacity and input voltage of the smart battery from the battery-controlling microprocessor (S51); detecting a charged level of the smart battery from the received data information (S52); determining whether the detected charged level is at a fully-charged level (S53); determining whether the data information is checked twice (S54); checking the power terminal and the temperature terminal of the smart battery (S55); detecting the voltage and temperature of the smart battery (S56); determining whether the detected battery voltage is higher than 14.5 Volts (S57); and completing the charging operation if the detected battery voltage is higher than 14.5 Volts (S58).

Figure 6:
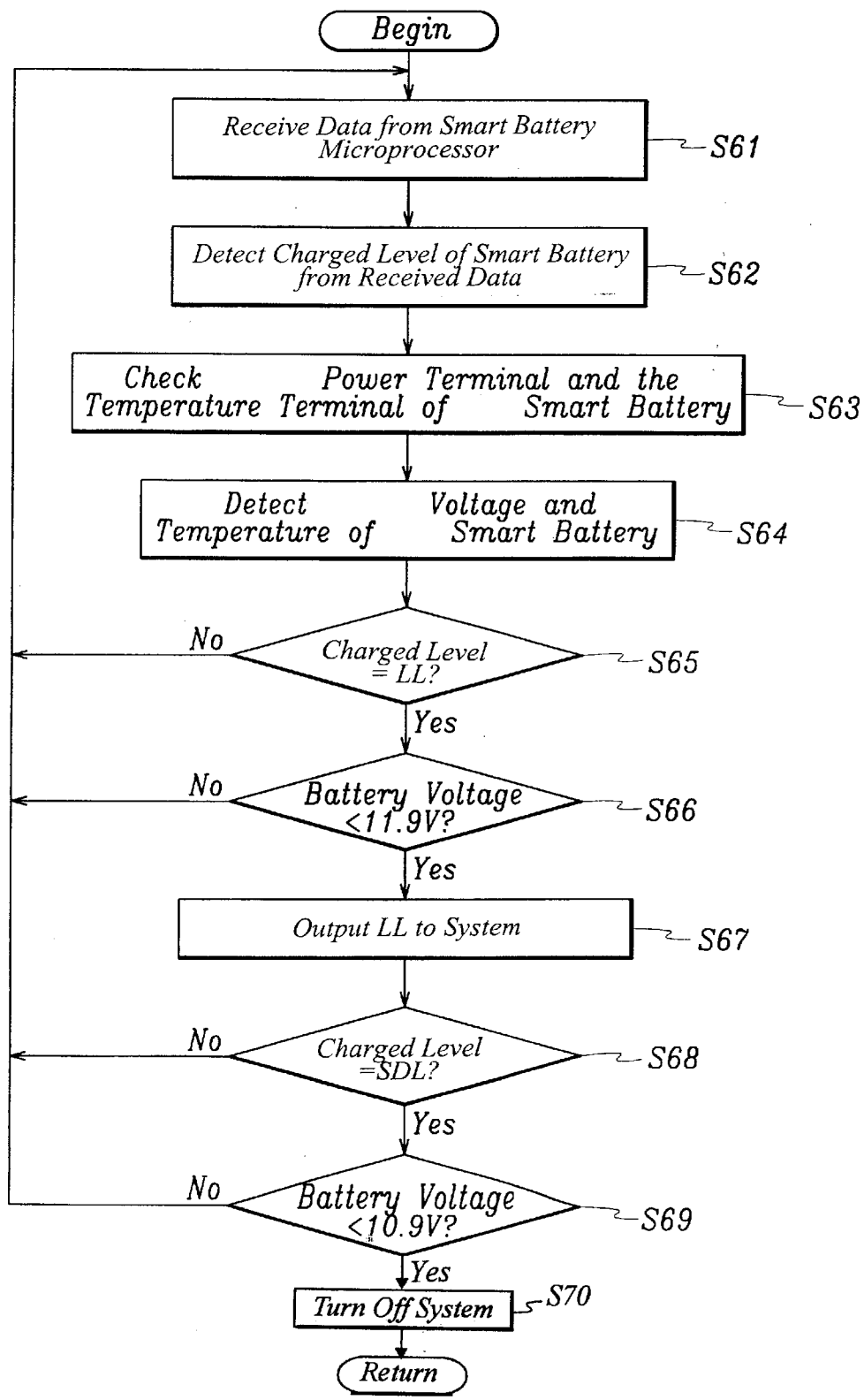
FIG. 6 is a flow chart of a process of discharging a smart battery of an electronic equipment according to a first preferred embodiment of the present invention.

For discharging purposes, the system is also required to receive data information from the smart battery microprocessor so as to detect a charged level of the smart battery. In a first embodiment as illustrated in FIG. 6, the power terminal and the temperature terminal of a smart battery are checked for detection of the voltage and temperature of the smart battery. Charged level of the smart battery is then determined as falling in a low-charged level (LL). If the charged level of the smart battery corresponds to the low-charged level (LL), the battery voltage is compared with a first predetermined voltage (e.g., 11.9 Volts) for output to the system. Next, if the charged level corresponds to an even lower-charged level or a shut-down level (SDL), the battery voltage is compared with a second predetermined voltage (e.g., 10.9 Volts) for completion. In particular, the process of discharging a smart batter of an electronic equipment according to the first embodiment of the present invention comprises the steps of receiving data information about the battery state, charging capacity and input voltage of the smart battery from the battery-controlling microprocessor of the smart battery (S61); detecting a charged level of the smart battery from the received data information (S62); checking the power terminal and the temperature terminal of the smart battery (S63); detecting the voltage and temperature of the smart battery (S64); determining whether the charged level is at a low-charged level LL (S65); determining whether the battery voltage is lower than 11.9 Volts (S66); outputting data information about the low battery state to the system if the charged level is at a low-charged level LL and the battery voltage is lower than 11.9 Volts (S67); determining whether the charged level is at a shut-down level SDL (S68); and determining whether the battery voltage is lower than 10.9 Volts (S69) and, if the battery voltage is lower than 10.9 Volts, turning off the system (S70).

Figure 7:
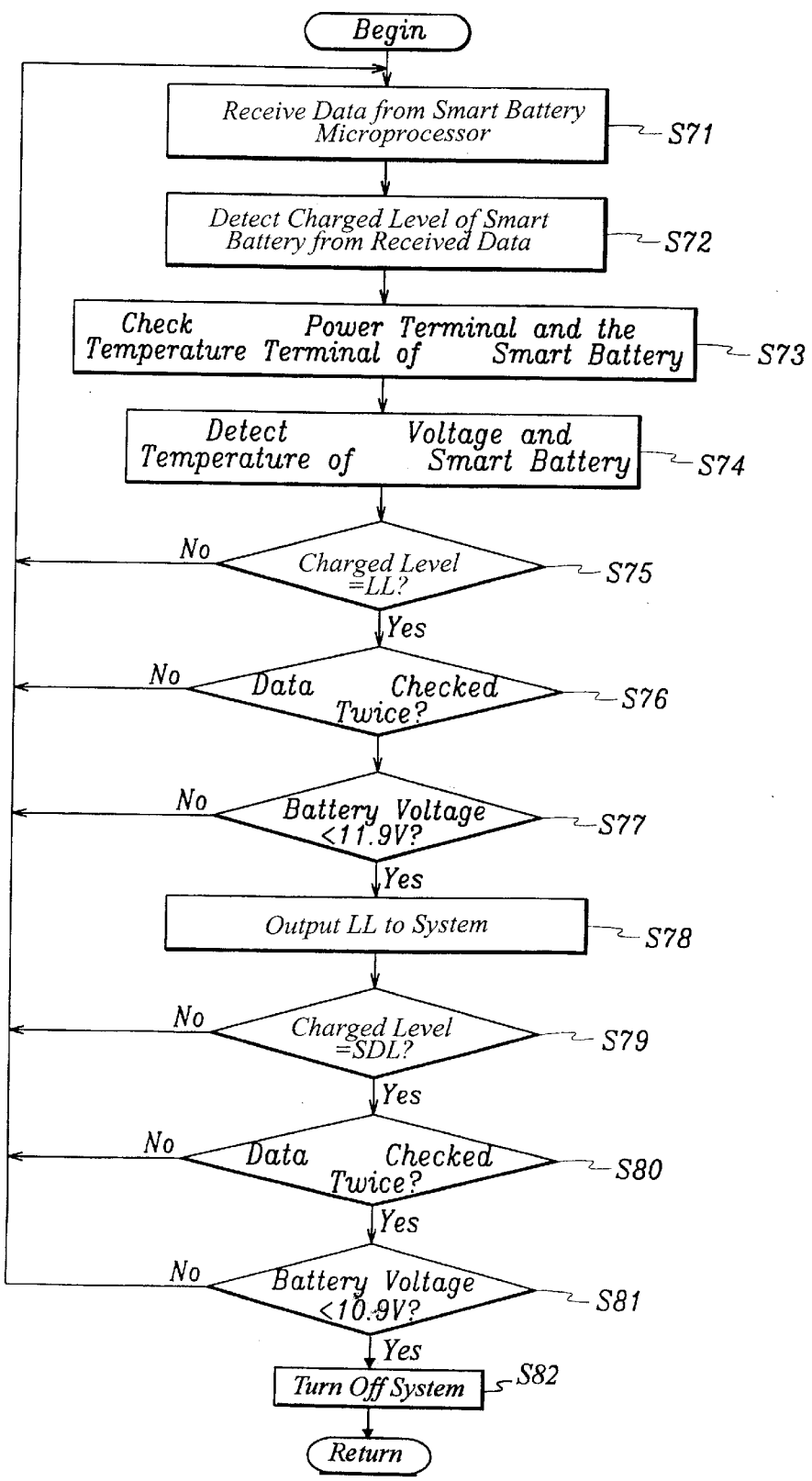
FIG. 7 is a flow chart of a process of discharging a smart battery o f an electronic equipment according to a second preferred embodiment of the present invention.

In a second embodiment as illustrated in FIG. 7, the power terminal and the temperature terminal of a smart battery are checked for detection of the voltage and temperature of the smart battery. Charged level of the smart battery is then determined as falling in a low-charged level (LL). Data information from the smart battery is also checked twice to ensure for accuracy. Then, the battery voltage is compared with a first predetermined voltage (e.g., 11.9 Volts) for output to the system. After the low-charged level (LL) is output to the system, the charged level of the smart battery is determined as corresponding to a even lower-charged level or a shut-down level (SDL). Data information from the smart battery is again checked twice to ensure for accuracy. Lastly, the battery voltage is compared with a second predetermined voltage (e.g., 10.9 Volts) for completion. In particular, the process of discharging a smart battery of an electronic equipment according to the second embodiment of the present invention comprises the steps of receiving data information about the battery state, charging capacity and input voltage of the smart battery from the battery-controlling microprocessor of the smart battery (S71);

detecting a charged level of the smart battery from the received data information (S72); checking the power terminal and the temperature terminal of the smart battery (S73); detecting the voltage and temperature of the smart battery (S74); determining whether the charged level is at a low-charged level LL (S75); determining whether the data information is checked twice (S76); determining whether the battery voltage is lower than 11.9 Volts (S77); outputting data information about the low battery state to the system if the charged level is at a low-charged level LL and the battery voltage is lower than 11.9 Volts (S78); determining whether the charged level is at a shut-down level SDL (S79); again determining whether the data information is checked twice (S80); and determining whether the battery voltage is lower than 10.9 Volts (S81) and, if the battery voltage is lower than 10.9 V, turning off the system (S82).

Figure 8:
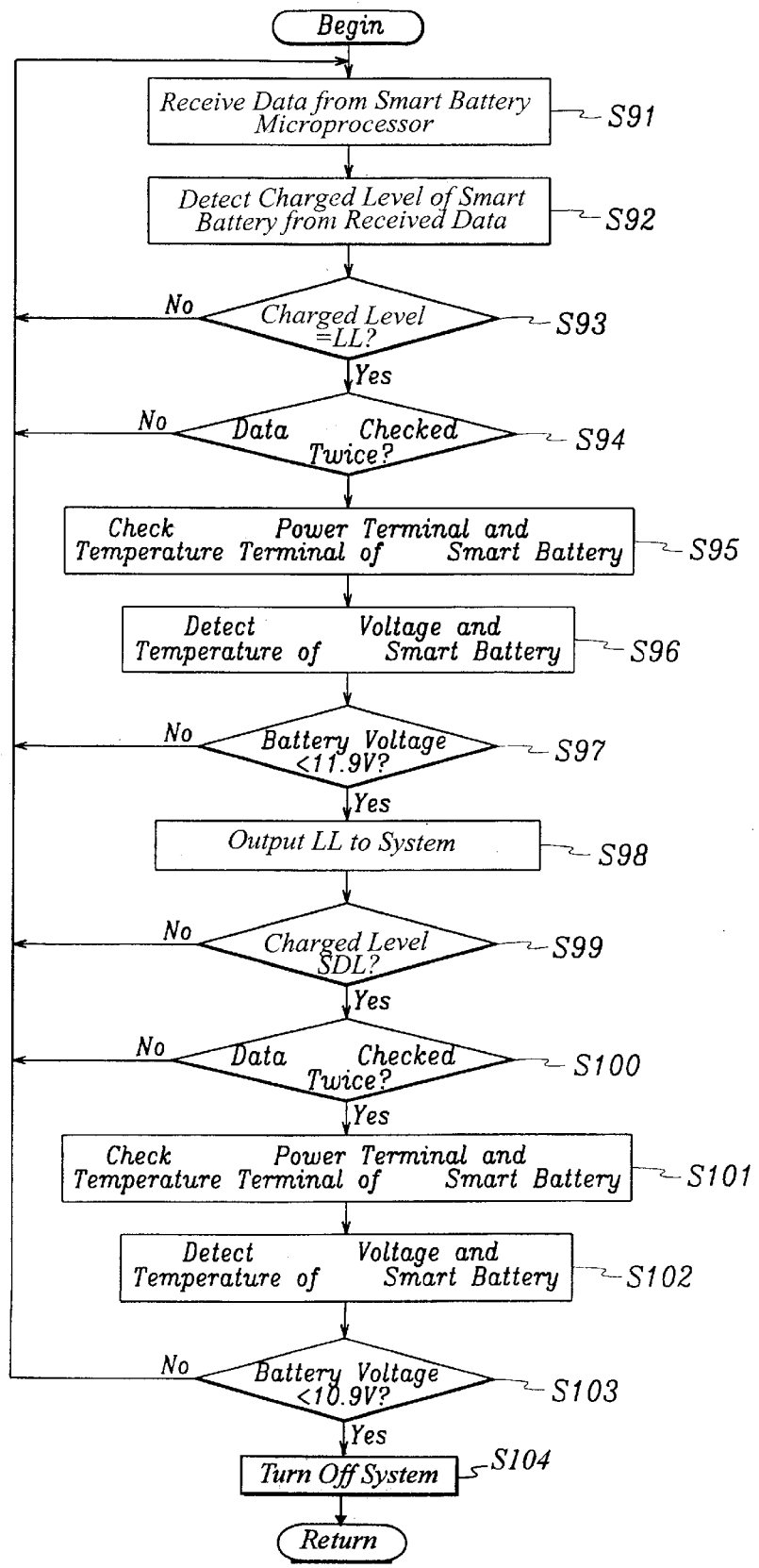
FIG. 8 is a flow chart of a process of discharging a smart battery of an electronic equipment according to a third embodiment of the present invention.

In a third embodiment as illustrated in FIG. 8, the charged level of the smart battery is determined immediately after detection of the charged level of the smart battery. Data information from the smart battery is also checked twice to ensure for accuracy. Then, the power terminal and temperature terminal of the smart battery are checked for detection of the voltage and temperature of the smart battery. Then, the battery voltage is compared with a first predetermined voltage (e.g., 11.9 Volts) for output to the system. After the low-charged level (LL) is output to the system, the charged level of the smart battery is determined as corresponding to a even lower-charged level or a shut-down level (SDL). Data information from the smart battery is again checked twice to ensure for accuracy. The power terminal and temperature terminal of the smart battery are again checked for detection of the voltage and temperature of the smart battery. Lastly, the battery voltage is compared with a second predetermined voltage (e.g., 10.9 Volts) for completion. In particular, the process of discharging a smart battery of an electronic equipment according to the third embodiment of the present invention comprises the steps of receiving data information about the battery state, charging capacity and input voltage of the smart battery from the battery-controlling microprocessor (S91); detecting a charged level of the smart battery from the received data information (S92); determining whether the charged level is at a low-charged level LL (S93); determining whether the data information is checked twice (S94); checking the power terminal and the temperature terminal of the smart battery (S95); detecting the voltage and temperature of the smart battery (S96); determining whether the battery voltage is lower than 11.9 Volts (S97); outputting data information about the low battery state to the system if the charged level is at a low-charged level LL and the battery voltage is lower than 11.9 Volts (S98); determining whether the charged level is at a shut-down level SDL (S99); again determining whether the data information is checked twice (S100); again checking the power terminal and the temperature terminal of the smart battery (S101); again detecting the voltage and temperature of the smart battery (S102); and determining whether the battery voltage is lower than 10.9 Volts (S103) and, if the battery voltage is lower than 10.9 Volts, turning off the system (S104).

Referring now to FIG. 2, the system 10 comprises a system-controlling microprocessor 11 incorporated for controlling the charging and discharging a smart battery 20 of an electronic equipment. The smart battery 20 also contains an embedded battery-controlling microprocessor 21 for providing a set of predefined battery parameters such as data information about the battery state, charging or remaining capacity and input voltage of the smart battery, and data information about the voltage and temperature of the smart battery.

The system-controlling microprocessor 11 of the system 10 outputs a clock and receives data information about the battery state, the charging or remaining capacity and the input voltage of the smart battery from the battery-controlling microprocessor 21, and also receives voltage and temperature of the smart battery through analog/digital converting terminals. In other words, after the smart battery 20 is connected to the system 10, the system 10 controls the charging and discharging of the smart battery 20 by receiving the data information of the smart battery 20. At this time, the system-controlling microprocessor 11 detects the voltage and temperature of the battery and then compensates the smart battery data such as the battery state, the changing or remaining capacity and the input voltage of the smart battery.

When the system-controlling microprocessor 11 measures the voltage and temperature of the smart battery, the analog/digital converter terminal converts the voltage and temperature of the smart battery to digital signals. In this situation, the battery voltage is higher than a reference voltage of the analog/digital converter terminal, a first resistor R1 and a second resistor R2 are arranged so as to divide the battery voltage to an appropriate level for the analog/digital converter terminal.

In accordance with the above-identified structure, the operations of charging and discharging a smart battery of an electronic equipment will now be described in detail with reference to FIGS. 3–8 as follows.

Referring to FIG. 3 which illustrates a process of charging and discharging a smart battery of an electronic equipment. First, the system-controlling microprocessor 11 of the system 10 determines whether a charging/discharging operation is initiated at step S1. After the charging/discharging operation is initiated, the system-controlling microprocessor 11 checks data information about the battery state, the charging or discharging capacity and the input voltage of the smart battery from the battery-controlling microprocessor 21 at step S2. After the data information of the smart battery is checked, the system-controlling microprocessor 11 continues to check the voltage and temperature of the smart battery at step S3.

As shown in FIGS. 4 through 8, the embodiments of a process of charging and discharging a smart battery of an electronic equipment will be described with reference to FIG. 2 as follows.

FIG. 4 illustrates a process of charging a smart battery of an electronic equipment according to the first embodiment of the present invention. First, the system-controlling microprocessor 11 of the system 10 receives data information about the battery state, charging capacity and input voltage of the smart battery 20 from the battery-controlling microprocessor 21 at step S41. After the data information from the battery-controlling microprocessor 21 is received through the system-controlling microprocessor 11 detects a charged level of the smart battery 20 from the received data information at step S42. The system-controlling microprocessor 11 then checks the power terminal and temperature terminal of the smart battery 20 through analog/digital converting terminals at step S43, and detects the voltage and temperature of the smart battery 20 at step S44. The system-controlling microprocessor 11 next determines whether the charged level is at a fully-charged level at step S45, and determines whether the data information is checked twice to ensure for accuracy at step S46. After the data information is checked twice, the system-controlling microprocessor 11 determines whether the battery voltage is higher than 14.5

Volts at step S47, and completes the charging operation if the directly-detected battery voltage is higher than 14.5 Volts at step S48.

FIG. 5 illustrates a process of charging a smart battery of an electronic equipment according to the second embodiment of the present invention. The system-controlling microprocessor 11 of the system 10 receives data information about the battery state, charging capacity and input voltage of the smart battery 20 from the battery-controlling microprocessor 21 at step S51. After the data information from the battery-controlling microprocessor 21 is received, the system-controlling microprocessor 11 detects a charged level of the smart battery 20 from the received data information at step S52. Then, the system-controlling microprocessor 11 determines whether the charged level is at a fully-charged level at step S53, and determines whether the data information is checked twice to ensure for accuracy at step S54. Next, the system-controlling microprocessor 11 checks, through analog/digital converting terminals the power terminal and the temperature terminal of the smart battery 20 at step S55, and detects the voltage and temperature of the smart battery 20 at step S56. After the voltage and temperature of the smart battery 20 are detected, the system-controlling microprocessor 11 determines whether the battery voltage is higher than 14.5 Volts at step S57, and completes the charging operation if the directly-detected battery voltage is higher than 14.5 Volts at step S58.

FIG. 6 illustrates a process of discharging a smart battery of an electronic equipment according to the first embodiment of the present invention. The system-controlling microprocessor 11 first receives data information about the battery state, charging capacity and input voltage of the smart battery 20 from the battery-controlling microprocessor 21 at step S61. After the data information from the battery-controlling microprocessor 21 is received, the system-controlling microprocessor 11 detects a charged level of the smart battery 20 from the received data information at step S62. The system-controlling microprocessor 11 then checks, through analog/digital converting terminals the power terminal and the temperature terminal of the smart battery 20 at step S63, and detects the voltage and temperature of the smart battery 20 at step S64. Next, the system-controlling microprocessor 11 determines whether the charged level is at a low-charged level LL at step S65, and determines whether the battery voltage is lower than 11.9 Volts at step S66. If the charged level is at a low-charged level LL and the battery voltage is lower than 11.9 Volts, the system-controlling microprocessor 11 outputs data information about the low battery state to the system 10 at step S67. After the data information about the low battery state is output to the system 10, the system-controlling microprocessor 11 determines whether the charged level is at a shut-down level SDL at step S68, and determines whether the battery voltage is lower than 10.9 Volts and, if the battery voltage is lower than 10.9 Volts, turns off the system 10 at step S69.

FIG. 7 illustrates a process discharging a smart battery of an electronic equipment according to the second embodiment of the present invention. First, the system-controlling microprocessor 11 receives data information about the battery state, charging capacity and input voltage of the smart battery 20 from the battery-controlling microprocessor 21 at step S71. After the data information is received, the system-controlling microprocessor 11 detects a charged level of the smart battery 20 from the received data information at step S72. Then, the system-controlling microprocessor 11 checks, through analog/digital converting terminals the power terminal and the temperature terminal of the smart battery 20 at step S73, and detects the voltage and temperature of the smart battery 20 at step S74. After the voltage and temperature of the smart battery 20 are detected, the system-controlling microprocessor 11 determines whether the charged level is at a low-charged level LL at step S75, determines whether the data information is checked twice to ensure for accuracy at step S76, and determines whether the battery voltage is lower than 11.9 Volts at step S77. If the charged level is at a low-charged level LL and the battery voltage is lower than 11.9 Volts, the system-controlling microprocessor 11 outputs data information about the low battery state to the system 10 at step S78. After the data information about the low battery state is output, the system-controlling microprocessor determines whether the charged level is at a shut-down level SDL at step S79, determines whether the data information is checked twice to ensure for accuracy at step S80, and again determines whether the battery voltage is lower than 10.9 Volts at step S81. If the battery voltage is lower than 10.9 V, the system-controlling microprocessor turns off the system 10 at step S82.

FIG. 8 illustrates a process of discharging a smart battery of an electronic equipment according to the third embodiment of the present invention. Likewise, the system-controlling microprocessor 11 receives data information about the battery state, charging capacity and input voltage of the smart battery 20 from the battery-controlling microprocessor 21 at step S91. After the data information is received, the system-controlling microprocessor 11 detects a charged level of the smart battery 20 from the received data information at step S92. Then, the system-controlling microprocessor 11 determines whether the charged level is at a low-charged level LL at step S93, and determines whether the data information is checked twice at step S94. Next, the system-controlling microprocessor 11 checks, through analog/digital converting terminals the power terminal and the temperature terminal of the smart battery 20 at step S95, detects the voltage and temperature of the smart battery 20 at step S96, and determines whether the battery voltage is lower than 11.9 Volts at step S97. If the charged level is at a low-charged level and the battery voltage is lower than 11.9 Volts, the system-controlling microprocessor 11 output data information about the low battery state to the system 10 at S98. After the data information about the low battery state is output to the system 10, the system-controlling microprocessor 11 determines whether the charged level is at a shut-down level SDL at step S99, and determines whether the data information is again checked twice at step S100. The system-controlling microprocessor 11 again checks the power terminal and the temperature terminal of the smart battery 20 at step S101, and detects the voltage and temperature of the smart battery 20 at step S102. After the voltage and temperature of the smart battery 20 are detected, the system-controlling microprocessor 11 determines whether the battery voltage is lower than 10.9 Volts at step S103 and, if the battery voltage is lower than 10.9 Volts, turning off the system at step S104.

As a result, as shown in FIG. 2, the system-controlling microprocessor 11 of the system 10 refers to the directly-checked battery voltage and temperature for controlling the charging and discharging of the smart battery 20 on the basis of the data information of the smart battery 20. When the charging operation is initiated, the system-controlling microprocessor 11 checks data information about the charging state, input voltage and remaining capacity from the smart battery 20 in order to control the charging operation of the smart battery. Also the system-controlling microprocessor 11 repeats the above-identified checking every fixed time and, when receiving the data information from the smart battery which the charging operation is completed, the system-controlling microprocessor 11 determines that the smart battery 20 is charged, only if the voltage from the above data information is higher than the reference voltage.

When performing the discharging control, the system-controlling microprocessor 11 receives data information relating to the battery state and remaining capacity from the battery-controlling microprocessor 21, and transmits the above data information to an application software. At this time, even if the data information indicates that the use of battery may be impossible, the system-controlling microprocessor 11 continuously uses the smart battery 20 if the detected battery voltage is higher than the reference voltage, and also transmits modified data information about the remaining capacity to the application software. Accordingly, it is possible to normally use the smart battery 20. This way the data information from the smart battery is compensated even if the data information from the smart battery is not accurate so that the smart battery can be continuously used in an electronic equipment. Accordingly it is possible to know the exact information about the smart battery used in an electronic equipment, and also a present standardized battery can be easily used.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for charging a smart battery having an embedded microprocessor for intelligent battery management in an electronic equipment, comprises the steps of:

receiving data information from the microprocessor of the smart battery and detecting a charged level of the smart battery from the data information;

checking a power terminal and a temperature terminal of the smart battery and directly detecting a battery voltage of the smart battery;

determining whether the charged level of the smart battery is at a fully-charged level, and whether the battery voltage is higher than a predetermined voltage; and completing the charging, when the charged level of the smart battery is at the fully-charged level and the battery voltage is higher than said predetermined voltage.

2. The method of claim 1, further comprised of rechecking whether the data information received from the microprocessor to ensure for accuracy after the charged level of the smart battery is determined at the fully-charged level.

3. The method of claim 1, further comprised of said predetermined voltage corresponding to 14.5 Volts.

4. A method for charging a smart battery having an embedded microprocessor implemented for intelligent battery management, comprises the steps of:

receiving data information from the smart battery and detecting a charged level of the smart battery from the data information;

determining whether the charged level of the smart battery is at a fully-charged level;

when the charged level of the smart battery is at the fully-charged level, checking a power terminal of the smart battery and directly detecting a battery voltage of the smart battery;

determining whether the battery voltage of the smart battery is greater than a predetermined voltage; and completing the charging, when the battery voltage of the smart battery is greater than said predetermined voltage.

5. The method of claim 4, further comprised of rechecking whether the data information received from the microprocessor to ensure for accuracy after the charged level of the smart battery is determined at the fully-charged level.

6. The method of claim 4, further comprised of said predetermined voltage corresponding to 14.5 Volts.

7. A method for charging and discharging a smart battery having an embedded microprocessor for intelligent battery management in an electronic system, comprising the steps of:

receiving data information from the microprocessor of the smart battery and determining a charged level of the smart battery;

detecting a battery voltage of the smart battery from a power terminal of the smart battery; and determining whether the smart battery is in a charged or discharged state by comparing a charged level, determined from data information received from the microprocessor, and a voltage, directly received from a voltage terminal of the smart battery.

8. A method for discharging a smart battery having an embedded microprocessor for intelligent battery management in an electronic system, comprises the steps of:

receiving data information from the microprocessor of the smart battery and detecting a charged level of the smart battery from the data information;

checking a power terminal and a temperature terminal of the smart battery and directly detecting a battery voltage of the smart battery;

determining whether the charged level of the smart battery is at a low-charged level;

when the charged level of the smart battery is at the low-charged level, determining whether the battery voltage of the smart battery is less than a first predetermined voltage;

when the battery voltage of the smart battery is less than said first predetermined voltage, outputting a low battery indication of the low-charged level to the electronic system;

after the low battery indication of the low-charged level is output to the electronic system, determining whether the charged level of the smart battery is at a shut-down level;

when the charged level of the smart battery is at the shut-down level, determining whether the battery voltage of the smart battery is less than a second predetermined voltage; and when the battery voltage of the smart battery is less than said second predetermined voltage, shutting down the electronic system.

9. The method of claim 8, further comprised of said first predetermined voltage corresponding to 11.9 Volts.

10. The method of claim 9, further comprised of said second predetermined voltage corresponding to 10.9 Volts.

11. A method for discharging a smart battery having an embedded microprocessor implemented for intelligent battery management, comprises the steps of:

receiving data information from the smart battery and detecting a charged level of the smart battery from the data information;

checking a power terminal and a temperature terminal of the smart battery and directly detecting a battery voltage of the smart battery;

determining whether the charged level of the smart battery is at a low-charged level;

when the charged level of the smart battery is at the low-charged level, determining whether the data information received from the microprocessor of the smart battery is checked twice;

after the data information received from the microprocessor of the smart battery is checked twice, determining whether the battery voltage of the smart battery is less than a first predetermined voltage;

when the battery voltage of the smart battery is less than said first predetermined voltage, outputting a low battery indication of the low-charged level to the electronic system;

after the low battery indication of the low-charged level is output to the electronic system, determining whether the charged level of the smart battery is at a shut-down level;

when the charged level of the smart battery is at the shut-down level, again determining whether the data information received from the microprocessor of the smart battery is checked twice;

after the data information received from the microprocessor of the smart battery is again checked twice, determining whether the battery voltage of the smart battery is less than a second predetermined voltage; and when the battery voltage of the smart battery is less than said second predetermined voltage, shutting down the electronic system.

12. The method of claim 11, further comprised of said first predetermined voltage corresponding to 11.9 Volts.

13. The method of claim 12, further comprised of said second predetermined voltage corresponding to 10.9 Volts.

14. A method for discharging a smart battery having an embedded microprocessor implemented for intelligent battery management, comprises the steps of:

receiving data information from the smart battery and detecting a charged level of the smart battery from the data information;

determining whether the charged level of the smart battery is at a low-charged level;

when the charged level of the smart battery is at the low-charged level, determining whether the data information received from the microprocessor of the smart battery is checked twice;

after the data information received from the microprocessor of the smart battery is checked twice, checking a power terminal of the smart battery and directly detecting a battery voltage of the smart battery;

determining whether the battery voltage of the smart battery is less than a first predetermined voltage;

when the battery voltage of the smart battery is less than said first predetermined voltage, outputting a low battery indication of the low-charged level to the electronic system;

after the low battery indication of the low-charged level is output to the electronic system, determining whether the charged level of the smart battery is at a shut-down level;

when the charged level of the smart battery is at the shut-down level, again determining whether the data information received from the microprocessor of the smart battery is checked twice;

after the data information received from the microprocessor of the smart battery is again checked twice, checking again the power terminal of the smart battery and directly detecting the battery voltage of the smart battery;

determining whether the battery voltage of the smart battery is less than a second predetermined voltage; and when the battery voltage of the smart battery is less than said second predetermined voltage, shutting down the electronic system.

15. The method of claim 14, further comprised of said first predetermined voltage corresponding to 11.9 Volts.

16. The method of claim 15, further comprised of said second predetermined voltage corresponding to 10.9 Volts.

* * * * *